US005190817A

United States Patent [19]

Terrell et al.

[11] Patent Number: 5,190,817

[45] Date of Patent: Mar. 2, 1993

[54] PHOTOCONDUCTIVE RECORDING ELEMENT

[75] Inventors: David R. Terrell, Lint; Stefaan K. De Meutter, Zandhoven, both of Belgium; Ulrich Grigo, Kempen; Volker Serini, Krefeld, both of Fed. Rep. of Germany

[73] Assignee: AGFA-Gevaert, N.V., Mortsel, Belgium

[21] Appl. No.: 611,526

[22] Filed: Nov. 13, 1990

[30] Foreign Application Priority Data

Nov. 13, 1989 [EP] European Pat. Off. ........ 89202864.8

[51] Int. Cl.[5] ............ B32B 9/00

[52] U.S. Cl. ............ 428/343; 428/76; 428/411.1; 428/457; 428/412; 428/195; 430/56; 430/58; 430/59

[58] Field of Search ............ 430/56, 58, 59; 428/195, 411.1, 457, 412, 76, 343

[56] References Cited

U.S. PATENT DOCUMENTS

| | | | |
|---|---|---|---|
| 4,900,418 | 2/1991 | Mukoh et al. | 430/56 |
| 5,037,714 | 8/1991 | Nozomi et al. | 430/58 |
| 5,045,421 | 9/1991 | Fuse et al. | 430/58 |

FOREIGN PATENT DOCUMENTS

| | | |
|---|---|---|
| 6052855 | 9/1983 | Japan . |
| 60-12552 | 1/1985 | Japan . |

*Primary Examiner*—Patrick J. Ryan
*Assistant Examiner*—William Krynski
*Attorney, Agent, or Firm*—Breiner & Breiner

[57] ABSTRACT

A photoconductive recording material having a conducting electrode element coated with one or more layers, one or more of said layers incorporating one or more polyester carbonate copolymers, wherein the aromatic carbonate units are present in the range of 10 to 48 mole % of said copolymer and correspond to the general formulae (I), and wherein the aromatic ester units are present in the range of 52 to 90 mole % of said copolymer and have one or more of the compositions represented by the general formulae (II and III) described herein.

12 Claims, No Drawings

PHOTOCONDUCTIVE RECORDING ELEMENT

DESCRIPTION

The present invention relates to photosensitive recording materials suitable for use in electrophotography.

In electrophotography photoconductive materials are used to form a latent electrostatic charge image that is developable with finely divided colouring material, called toner.

The developed image can then be permanently affixed to the photoconductive recording material, e.g. a photoconductive zinc oxide-binder layer, or transferred from the photoconductor layer, e.g. a selenium or selenium alloy layer, onto a receptor material, e.g. plain paper and fixed thereon. In electrophotographic copying and printing systems with toner transfer to a receptor material the photoconductive recording material is reusable. In order to permit rapid multiple printing or copying, a photoconductor layer has to be used that rapidly looses its charge on photo-exposure and also rapidly regains its insulating state after the exposure to receive again a sufficiently high electrostatic charge for a next image formation. The failure of a material to return completely to its relatively insulating state prior to succeeding charging/imaging steps is commonly known in the art as "fatigue".

The fatigue phenomenon has been used as a guide in the selection of commercially useful photoconductive materials, since the fatigue of the photoconductive layer limits the copying rates achievable.

A further important property which determines the suitability of a particular photoconductive material for electrophotographic copying is its photosensitivity, which must be sufficiently high for use in copying apparatuses operating with the fairly low intensity light reflected from the original. Commercial usefulness also requires that the photoconductive layer has a spectral sensitivity that matches the spectral intensity distribution of the light source e.g. a laser or a lamp. This enables, in the case of a white light source, all the colours to be reproduced in balance.

Known photoconductive recording materials exist in different configurations with one or more "active" layers coated on a conducting substrate and include optionally an outermost protective layer. By "active" layer is meant a layer that plays a role in the formation of the electrostatic charge image. Such layer may be a layer responsible for charge carrier generation, charge carrier transport or both. Such layers may have a homogeneous structure or heterogeneous structure.

Examples of active layers in said photoconductive recording material having a homogeneous structure are layers made of vacuum-deposited photoconductive selenium, doped silicon, selenium alloys and homogeneous photoconducting polymer coatings, e.g. of poly(-vinylcarbazole) or polymeric binder(s) molecularly doped with a charge carrier transport compound such as particular hydrazones, amines and heteroaromatic compounds sensitized by a dissolved dye, so that in said layers both charge carrier generation and charge carrier transport takes place.

Examples of active layers in said photoconductive recording material having a heterogeneous structure are layers of one or more photosensitive organic or inorganic charge generating pigment particles dispersed in a polymer binder or polymer binder mixture in the presence optionally of (a) molecularly dispersed charge transport compound(s), so that the recording layer may exhibit only charge carrier generation properties or both charge carrier generation and charge transport properties.

According to an embodiment that may offer photoconductive recording materials with particularly low fatigue a charge generating and charge transporting layer are combined in contiguous relationship. Layers which serve only for charge transport of charge generated in an adjacent charge generating layer are e.g. plasma-deposited inorganic layers, photoconducting polymer layers, e.g. on the basis of poly(N-vinylcarbazole) or layers made of a low molecular weight organic compounds of the group of hydrazones, amines and heteroaromatic compounds molecularly distributed in a polymer binder or binder mixture.

Useful organic charge carrier generating pigments belong to one of the following classes:

a) perylimides, e.g. C.I. 71 130 (C.I.=Colour Index) described in DBP 2 237 539;
b) polynuclear quinones, e.g. anthanthrones such as C.I. 59 300 described in DBP 2 237 678;
c) quinacridones, e.g. C.I. 46 500 described in DBP 2 237 679;
d) naphthalene 1,4,5,8-tetracarboxylic acid derived pigments including the perinones, e.g. Orange GR, C.I. 71 105 described in DBP 2 239 923;
e) phthalocyanines and naphthalocyanines, e.g. $H_2$-phthalocyanine in X-crystal form (X-$H_2$Pc) described in U.S. Pat. No. 3,357,989, metal phthalocyanines, e.g. CuPc C.I. 74 160 described in DBP 2 239 924 and indium phthalocyanine described in U.S. Pat. No. 4,713,312; and naphthalocyanines having siloxy groups bonded to the central metal silicon described in published EP-A 243,205;
f) indigo- and thioindigo dyes, e.g. Pigment Red 88, C.I. 73 312 described in DBP 2 237 680;
g) benzothioxanthene derivatives as described e.g. in Deutsches Auslegungsschrift (DAS) 2 355 075;
h) perylene 3,4,9,10-tetracarboxylic acid derived pigments including condensation products with o-diamines as described e.g. in DAS 2 314 051;
i) polyazo-pigments including bisazo-, trisazo- and tetrakisazo-pigments, e.g. Chloridiane Blue C.I. 21 180 described in DAS 2 635 887, and bisazo-pigments described in Deutsches Offenlegungsschrift (DOS) 2 919 791, DOS 3 026 653 and DOS 3 032 117;
j) squarylium dyes as described e.g. in DAS 2 401 220;
k) polymethine dyes;
l) dyes containing quinazoline groups, e.g. as described in GB-P 1,416,602 according to the following general formula:

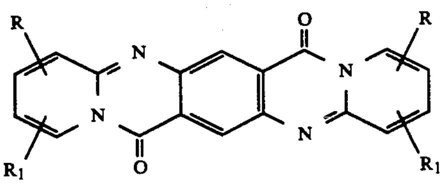

in which R and $R_1$ are either identical or different and denote hydrogen, $C_1$-$C_4$ alkyl, alkoxy, halogen, nitro or hydroxyl or together denote a fused aromatic ring system;

m) triarylmethane dyes; and n) dyes containing 1,5 diamino-anthraquinone groups.

Organic charge carrier transporting substances may be either polymeric or non-polymeric materials.

Examples of preferred polymeric positive hole charge carrier transporting substances are poly(N-vinylcarbazole), N-vinylcarbazole copolymers, polyvinyl anthracene and the condensation products of an aldehyde with two or more 1,2-dihydroquinoline molecules as described in non-published EP application No. 89 200 707.1.

Preferred non-polymeric materials for positive charge transport are:

a) hydrazones e.g. a p-diethylaminobenzaldehyde diphenyl hydrazone as described in U.S. Pat. No. 4,150,987; and other hydrazones described in U.S. Pat. No. 4,423,129; U.S. Pat. No. 4,278,747 and U.S. Pat. No. 4,365,014;
b) aromatic amines e.g. N,N'-diphenyl, N,N-bis-m-tolyl benzidine as described in U.S. Pat. No. 4,265,990, tris(p-tolyl)amine as described in U.S. Pat. No. 3,180,730 and 1,3,5-tris(aminophenyl)benzenes as described in non-published EP application 88 20 1332.9;
c) heteroaromatic compounds e.g. N-(p-aminophenyl) carbazoles as described in U.S. Pat. No. 3,912,509 and dihydroquinoline compounds as described in U.S. Pat. No. 3,832,171 and U.S. Pat. No. 3,830,647;
d) triphenylmethane derivatives as described for example in U.S. Pat. No. 4,265,990;
e) pyrazoline derivatives as described for example in U.S. Pat. No. 3,837,851;
f) stilbene derivatives as described for example in Japanese Laid Open Patent Application (JL-OP) 198,043/83;

and for negative charge transport are:

a) nitrated fluorenones such as 2,4,7-trinitrofluorenone and 2,4,5,7-tetranitrofluorenone;
b) nitrated dicyano-methylene-fluorene compounds such as 2,4,7-trinitro-1,1-dicyanomethylene fluorene;
c) 4H-thiopyran-1,1-dioxide as described in EP 157,492;
d) sulfur incorporated dicyanofluorene carboxylate derivatives as described in U.S. Pat. No. 4,546,059;

Preferred negative charge, i.e. electron transporting compounds have the following formula:

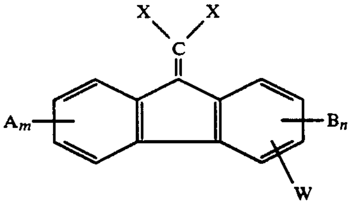

wherein X is cyano or alkoxycarbonyl, A and B are electron withdrawing groups, m is a number of from 0 to 2, n is the number 0 or 1, and W is an electron withdrawing group selected from the group consisting of acyl, alkoxycarbonyl, alkylamino carbonyl and derivatives thereof as disclosed e.g. in U.S. Pat. No. 4,562,132.

In an electrophotographic copying or printing process the recording layers are subject to mechanical abrasion which takes place e.g. in magnetic brush development, transfer of toner to paper or other substrates and mechanical cleaning wherein untransferred toner is removed with a scraper or a brush.

The abrasion resistance and surface behaviour of the photoconductive recording material are determined by the composition of the outermost layer. This may be an active layer in the sense as defined above or a protective layer. Binderless polymeric charge carrier transport layers are brittle and hence exhibit poor abrasion resistance as is also the case also with binderless inorganic and organic photoconductor layers for which a protective layer is required.

Various electronically inactive binder resins have been proposed for use in photoconductive recording layer materials.

Polycarbonates by virtue of their being excellent solvents for charge carrier transport molecules and their electronic inactivity are widely used as binder resins for photoconductors.

U.S. Pat. No. 2,999,750 disclosed the use of high molecular weight polycarbonates based on 4,4'di-monohydroxy-aryl-alkanes having the following general formula:

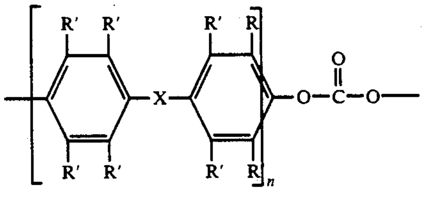

wherein each of R' (same or different) represents a hydrogen atom, a monovalent, branched or unbranched aliphatic hydrocarbon radical with up to five carbon atoms, a monovalent cyclo-aliphatic radical or an aromatic hydrocarbon radical, and X represents 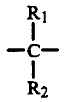 or 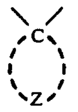

wherein each of $R_1$ and $R_2$ is a hydrogen atom, branched or unbranched monovalent hydrocarbon radical with not more than 10 carbon atoms, monovalent cyclo-aliphatic radical, monovalent araliphatic radical, phenyl or furyl radical, Z represents the atoms necessary to form with the associated carbon atom a cycloaliphatic ring, and n is a whole number greater than 20, preferably greater than 50.

U.S. Pat. No. 4,637,971 disclosed the utilization of polycarbonates with compositions of formula (A) or (B):

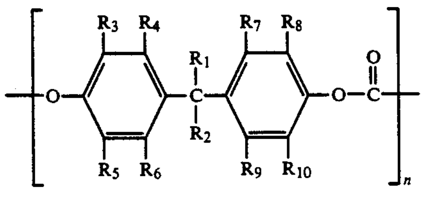

(A)

-continued (B)

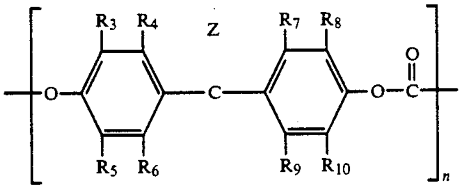

wherein $R_1$ and $R_2$ are independently hydrogen, substituted or unsubstituted aliphatic, or a substituted or unsubstituted hydrocarbon ring, provided that at least one of $R_1$ and $R_2$ has at least 3 carbon atoms, Z represents a group of atoms necessary to constitute a substituted or unsubstituted carbon ring or a substituted or unsubstituted heterocyclic ring, $R_3$ to $R_{10}$ in formulas (A) and (B) are independently hydrogen, halogen, substituted or unsubstituted aliphatic, or a substituted or unsubstituted hydrocarbon ring, and n is a number from 10 to 1000.

European patent application 237,953 disclosed a photosensitive member for electrophotography comprising a photosensitive layer on a conductive substrate, the photosensitive layer containing as a binder resin a modified polycarbonate resin having repeating structural units represented by the following general formulae (1) and (2):

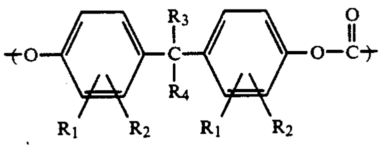

(1)

wherein $R_1$ and $R_2$ are selected from a hydrogen atom, an alkyl group having 1-3 carbon atoms and a halogen atom, at least one of $R_1$ and $R_2$ being the alkyl group, and $R_3$ and $R_4$ independently represent an alkyl group having 1-3 carbon atoms or a hydrogen atom, and

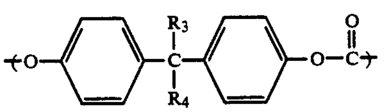

(2)

wherein $R_3$ and $R_4$ are the same as defined in the above formula (1). The ratio of the structural unit (1) to (2) is at least 20:80. This photosensitive member is according to the discloses highly resistant to mechanical wear without deterioration of sensitivity and chargeability.

However, particularly when palsticized by the presence of low molecular weight charge carrier transport molecules polycarbonates exhibit inadequate mechanical toughness and thus poor abrasion resistance in addition to their well-known susceptibility to crazing in contact with solvents used in liquid toner development.

In Japanese Patent Application 62-267,747 (Kokai) has been disclosed the use of polyester carbonates with following structural units:

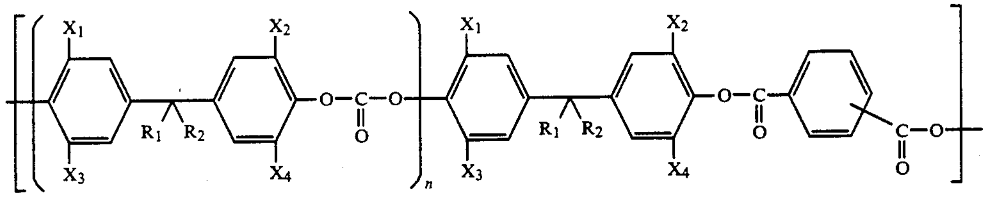

where n is an integer from 1 to 4, $R_1$ and $R_2$ are independently hydrogen, alkyl or an aromatic group and $X_1$, $X_2$, $X_3$ and $X_4$ are independently hydrogen, a halogen atom or an alkyl group and weight averaged molecular weights between 10,000 and 100,000 as binders in photoconductive layers, according to the disclosers, satisfactory abrasion resistance and excellent layer adhesion and when used as protective layers exhibit, according to the disclosers, solvent resistance and very good mechanical properties.

It is significant that the maximum concentration of ester groups in this copolymer is 50 mol %, which is equivalent to 58.5 wt % in the event that $X_1=X_2=X_3=X_4=H$ and $R_1=R_2=CH_3$. In general the abrasion resistance of such copolymers would be expected to increase with increasing ester group concentration, however, the probability of charge transfer complex formation would also increase due to donor-acceptor interaction between the aromatic ester groups of the binder and hole-conducting charge transport materials as evidenced by the yellow colouration resulting from the mixing of virtually colourless dichloromethane solutions of charge transport material and polyester carbonate. Such charge transfer complexes increase the absorption of charge transport layers to visible light and hence the production of negatively and positively charged charge carriers with resulting trapping in these layers. However, this would be a marginal effect compared with the expected trapping of holes at such charge transfer complex defects in the charge transport layer. The limit of 50 mol % of aromatic ester groups in said JP patent application thus represents a balance between the enhanced abrasion resistance of such polyester carbonates and the expected deterioration in electro-optical properties resulting from charge transfer complex formation between the aromatic ester groups and the hole-transporting charge transport molecules. Surprisingly the inventors found that whereas the expected marginal improvement in abrasion resistance with aromatic ester group concentration was observed, the expected deterioration in electro-optical properties was not observed. Furthermore, a further enhancement in abrasion resistance was observed for polyester carbonate binders with weight averaged molecular weights above 100,000.

According to Japanese Patent Application 62-267,747, aromatic polyester carbonates within the composition range given in said patent application with weight averaged molecular weights above 10,000 and in particular between 25,000 and 100,000 exhibit excellent adhesion to aluminium. According to example 2 of said patent charge transport layers consisting of 50% by weight of bis[4-N-phenyl-4-N-(2-methylphenyl)-3-methoxy]benzidine in an aromatic polyester carbonate containing 50 mol % aromatic ester groups and in which $X_1=X_2=X_3=X_4=H$ and $R_1=R_2=CH_3$ exhibit very good adhesion to an aluminium substrate. However, surprisingly when such low molecular weight aromatic polyester carbonates are used as binders in the charge generating layer with charge generating materials the adhesion to a conductive metal substrate, e.g. aluminized polyester base, is very poor. Only aromatic polyester carbonates with higher weight averaged molecular weights above 100,000 exhibit good adhesion in charge generating layers with charge generating materials.

It is an object of the present invention to provide a photoconductive recording material with good abrasion resitance and high photosensitivity.

It is a further object of the present invention to provide a photoconductive recording material wherein a charge generating layer has improved adhesion to an adjacent conductive electrode element.

It is still a further object of the present invention to provide a photoconductive recording material wherein the binder of the charge transporting layer is highly compatible with charge carrier transporting substances.

Other objects and advantages of the present invention will appear from the further description and examples.

In accordance with the present invention a photoconductive recording material is provided having a conducting electrode element coated with one or more layers, one or more of said layers incorporating one or more polyester carbonate copolymers, wherein the aromatic carbonate units are present in the range of 10 to 48 mole % of said copolymer and correspond to the following general formula (I):

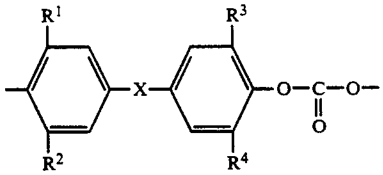

(I)

in which: X represents S, $SO_2$,

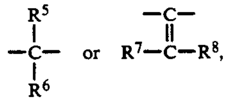

each of $R^1$, $R^2$, $R^3$, $R^4$, $R^7$ and $R^8$ (same or different) represents hydrogen, halogen, an alkyl group or an aryl group, and each of $R^5$ and $R^6$ (same or different) represents hydrogen, an alkyl group, an aryl group or together represent the necessary atoms to close a cycloaliphatic ring, e.g. a cyclohexane ring, and wherein the aromatic ester units are present in the range of 52 to 90 mole % of said copolymer and have one or more of the compositions represented by the general formulae (II and III):

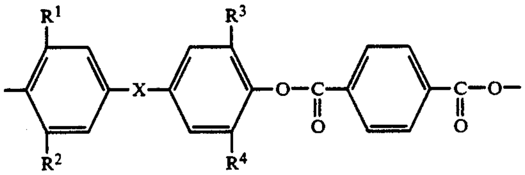

(II)

-continued

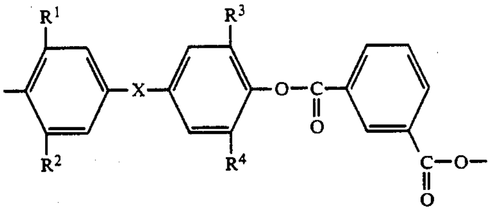

(III)

in which: X, $R^1$, $R^2$, $R^3$ and $R^4$ have the same meaning as described above, said polyester carbonate having a weight averaged molecular weight in the range 120,000 to 1,000,000.

In said photoconductive recording material the layer in direct contact with the conductive electrode element is an "active" layer in sense that has been defined already above. In functionally separated versions said layer may be a charge transport layer or charge generating layer, and in non-functionally separated versions is a single active layer containing both charge generating and charge transporting substances.

Photoconductive recording materials according to the present invention containing at least one of said polyester carbonate copolymer(s) in an "active" layer adjacent to the conducting electrode element, being a supported layer or selfsupporting base, exhibit good adhesion of said "active" layer to said electrode element.

According to one embodiment a photoconductive recording material according to the present invention has a charge transport layer containing as the sole binder one or more of said polyester carbonate copolymers and at least 30 wt % of charge transport substance(s).

According to another embodiment a photoconductive recording material according to the present invention has a charge generating layer containing as the sole binder one or more of said polyester carbonate copolymers and at least 30 wt % of charge generating substance(s).

According to a special embodiment the recording material according to the present invention contains an outermost "non-active" layer serving as protective layer with good abrasion resistance, which layer consists of at least one of said polyester carbonate copolymers or contains at least one of said copolymers in combination with at least one other polymer.

The copolymers used according to the present invention may be prepared analogously to processes disclosed in U.S. Pat. Nos. 3,030,331; 3,169,121; 3,553,167; 4,137,278; 4,156,069; 4,219,635; 4,330,663; 4,360,656 or 4,438,255; DE-OS 3,016,020; DE-OS 3,223,980 or EP 8 492; 36 080; 36 629; 79 075 or FR-P 1 177 517.

The polyester carbonate copolymer(s) applied according to the present invention may be used in combination with at least one other polymer serving as binding agent, e.g. in combination with acrylate and methacrylate resins, copolyesters of a diol, e.g. glycol, with isophthalic and/or terephthalic acid, polyacetals, polyurethanes, polyester-urethanes, aromatic polycarbonates, wherein a preferred combination contains at least 50% by weight of said polyester carbonate copolymers in the total binder content.

A polyester resin particularly suited for used in combination with said polyester carbonate copolymer is DYNAPOL L 206 (registered trade mark of Dynamit Nobel for a copolyester of terephthalic acid and isophthalic acid with ethylene glycol and neopentyl glycol, the molar ratio of tere- to isophthalic acid being 3/2). Said polyester resin improves the adherence to aluminium that may form a conductive coating on the support of the recording material.

Aromatic polycarbonates that are suitable for use in admixture with said polyester carbonate copolymer(s) can be prepared by methods such as those described by D. Freitag, U. Grigo, P. R. Müller and W. Nouvertné in the Encyclopedia of Polymer Science and Engineering, 2nd ed., Vol. II, pages 648–718, (1988) published by Wiley and Sons Inc., and have one or more repeating units within the scope of following general formula:

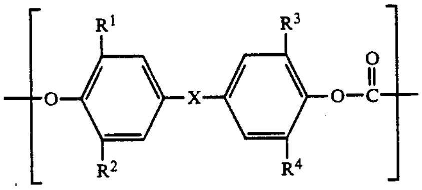

wherein: X, $R^1$, $R^2$, $R^3$ and $R^4$ have the same meaning as described in general formula (I) above.

Aromatic polycarbonates having a molecular weight in the range of 10,000 to 200,000 are preferred. Suitable polycarbonates having such a high molecular weight are sold under the registered trade mark MAKROLON of Bayer AG, W-Germany.

MAKROLON CD 2000 (registered trade mark) is a bisphenol A polycarbonate with molecular weight in the range of 12,000 to 25,000 wherein $R^1$=$R^2$=$R^3$=$R^4$=H, X is $R^5$—C—$R^6$ with $R^5$=$R^6$=$CH_3$.

MAKROLON 5700 (registered trade mark) is a bisphenol A polycarbonate with molecular weight in the range of 50,000 to 120,000 wherein $R^1$=$R^2$=$R^3$=$R^4$=H, X is $R^5$—C—$R^6$ with $R^5$=$R^6$=$CH_3$.

Bisphenol Z polycarbonate is an aromatic polycarbonate containing recurring units wherein $R^1$=$R^2$=$R^3$=$R^4$=H, X is $R^5$—C—$R^6$, and $R^5$ together with $R^6$ represents the necessary atoms to close a cyclohexane ring.

Suitable electronically inactive binder resins for use in active layers of the present photoconductive recording material not containing said polyester carbonate copolymers are e.g. the above mentioned polyester and polycarbonates, but also cellulose esters, acrylate and methacrylate resins, e.g. cyanoacrylate resins, polyvinyl chloride, copolymers of vinyl chloride, e.g. copolyvinyl chloride/acetate and copolyvinyl chloride/maleic anhydride, polyester resins, e.g. copolyesters of isophthalic acid and terephthalic acid with glycol and aromatic polycarbonate resins.

Further useful binder resins for an active layer are silicone resins, polystyrene and copolymers of styrene and maleic anhydride and copolymers of butadiene and styrene.

Charge transport layers in the photoconductors of the present invention preferably have a thickness in the range of 5 to 50 μm, more preferably in range of 5 to 30 μm. If these layers contain low molecular weight charge transport molecules, such compounds will preferably be present in concentrations of 30 to 70% by weight.

Photoconductive recording materials according to the present invention with a single active layer preferably contain such a layer with a thickness in the range of 5 to 50 μm, more preferably in the range of 5 to 30 μm. If such a layer contains low molecular weight charge transport molecules they are present preferably in concentrations of 3 to 50% by weight. Charge generating pigments or dyes in such active layer are present preferably in concentrations between 0.1 and 40% by weight.

The presence of one or more spectral sensitizing agents can have an advantageous effect on the charge transport. In that connection reference is made to the methine dyes and xanthene dyes described in U.S. Pat. No. 3,832,171. Preferably these dyes are used in an amount not substantially reducing the transparency in the visible light region (420–750 nm) of the charge transporting layer.

The charge transporting layer may contain compounds substituted with electron-acceptor groups forming an intermolecular charge transfer complex, i.e. donor-acceptor complex when electron donor charge transport compounds are present. Useful compounds having electron-accepting groups are nitrocellulose and aromatic nitro-compounds such as nitrated fluorenone-9 derivatives, nitrated 9-dicyanomethylene fluorenone derivatives, nitrated naphthalenes and nitrated naphthalic acid anhydrides or imide derivatives. The preferred concentration range of said compounds having electron acceptor groups is such that the molar donor/acceptor ratio is 10:1 to 1,000:1 and vice versa.

Compounds acting as stabilising agents against deterioration by ultra-violet radiation, so-called UV-stabilizers, may also be incorporated in said charge transport layer. Examples of UV-stabilizers are benztriazoles.

For controlling the viscosity and aiding deaeration of the coating compositions and controlling their optical clarity silicone oils may be added to the charge transport layer.

As charge generating compounds for use in a recording material according to the present invention any of the organic pigments belonging to one of the classes a) to n) mentioned hereinbefore may be used. Further examples of pigments useful for photogenerating positive charge carriers are disclosed in U.S. Pat. No. 4,365,014.

Inorganic substances suited for photogenerating positive charges in a recording material according to the present invention are e.g. amorphous selenium and selenium alloys e.g. selenium-tellurium, selenium-tellurium-arsenic and selenium-arsenic and inorganic photoconductive crystalline compounds such as cadmium sulphoselenide, cadmium selenide, cadmium sulphide and mixtures thereof as disclosed in U.S. Pat. No. 4,140,529.

Said photoconductive substances functioning as charge generating compounds may be applied to a support with or without a binding agent. For example, they are coated by vacuum-deposition without binder as described e.g. in U.S. Pat. Nos. 3,972,717 and 3,973,959. When dissolvable in an organic solvent the photoconductive substances may likewise be coated using a wet coating technique known in the art whereupon the solvent is evaporated to form a solid layer. When used in combination with a binding agent or agents at least the binding agent(s) should be soluble in the coating solution and the charge generating compound dissolved or dispersed therein. The binding agent(s) may be the same as the one(s) used in the charge transport layer which normally provided best adhering contact. In some cases it may be advantageous to use in one or both of said layers a plasticizing agent, e.g. halogenated paraffin, polybiphenyl chloride, dimethylnaphthalene or dibutyl phthalate.

The thickness of the charge generating layer is preferably not more than 10 μm, more preferably not more than 5 μm.

In recording materials of the present invention an adhesive layer or barrier layer may be present between the charge generating layer and the support or the charge transport layer and the support. Useful for that purpose are e.g. a polyamide layer, nitrocellulose layer, hydrolysed silane layer, or aluminium oxide layer acting as blocking layer preventing positive or negative charge injection from the support side. The thickness of said barrier layer is preferably not more than 1 micron.

The conductive support may be made of any suitable conductive material. Typical conductors include aluminium, steel, brass and paper and resin materials incorporating or coated with conductivity enhancing substances, e.g. vacuum-deposited metal, dispersed carbon black, graphite and conductive monomeric salts or a conductive polymer, e.g. a polymer containing quaternized nitrogen atoms as in Calgon Conductive polymer 261 (trade mark of Calgon Corporation, Inc., Pittsburgh, Pa., U.S.A.) described in U.S. Pat. No. 3,832,171.

The support may be in the form of a foil, web or be part of a drum.

An electrophotographic recording process according to the present invention comprises the steps of:

(1) overall electrostatically charging, e.g. with corona-device, a charge transporting layer or charge generating layer in the case of a two layer recording material or a single photosensitive layer of a monolayer recording material according to the present invention, and (2) image-wise photo-exposing said charge generating layer of the two layer recording material or the single photosensitive layer of a monolayer recording material according to the present invention obtaining thereby a latent electrostatic image.

In the case of using said two layer recording material photo-exposure of the charge generating layer proceeds preferably through the charge transporting layer but may be direct if the charge generating layer is outermost or may proceed likewise through the conductive support if the latter is transparent enough to the exposure light. In the case of monolayer recording materials the photo-exposure preferably proceeds directly or may proceed through the conductive support.

The development of the latent electrostatic image commonly occurs with finely divided electrostatically attractable material, called toner particles that are attracted by coulomb force to the electrostatic charge pattern. The toner development is a dry or liquid toner development known to those skilled in the art.

In positive-positive development toner particles deposit on those areas of the charge carrying surface which are in positive-positive relation to the original image. In reversal development, toner particles migrate and deposit on the recording surface areas which are in negative-positive image value relation to the original. In the latter case the areas discharged by photo-exposure obtain by induction through a properly biased developing electrode a charge of opposite charge sign with respect to the charge sign of the toner particles so that the toner becomes deposited in the photo-exposed areas that were discharged in the imagewise exposure (ref.: R. M. Schaffert "Electrophotography"—The Focal Press—London, New York, enlarged and revised edition 1975, p. 50-51 and T. P. Maclean "Electronic Imaging" Academic Press—London, 1979, p. 231).

According to a particular embodiment electrostatic charging, e.g. by corona, and the imagewise photo-exposure proceed simultaneously.

Residual charge after toner development may be dissipated before starting a next copying cycle by overall exposure and/or alternating current corona treatment.

Recording materials according to the present invention depending on the spectral sensitivity of the charge generating layer may be used in combination with all kinds of photon-radiation, e.g. light of the visible spectrum, infra-red light, near ultra-violet light and likewise X-rays when electron-positive hole pairs can be formed by said radiation in the charge generating layer. Thus, they can be used in combination with incandescent lamps, fluorescent lamps, laser light sources or light emitting diodes by proper choice of the spectral sensitivity of the charge generating substance or mixtures thereof.

The toner image obtained may be fixed onto the recording material or may be transferred to a receptor material to form thereon after fixing the final visible image.

A recording material according to the present invention showing a particularly low fatigue effect can be used in recording apparatus operating with rapidly following copying cycles including the sequential steps of overall charging, imagewise exposing, toner development and toner transfer to a receptor element.

The wear characteristics of the recording materials of the following examples have been assessed on the basis of abrasion experiments with a TELEDYNE TABER Model 505 Dual Abrasion Tester (Teledyne Taber is a registered trade name) with a loading of 500 g and with CS-10F standardized abrasion test wheels. During these experiments the abraded material was continuously removed with a vacuum cleaner. The quantity of material removed after 500 rotations (200 rotations in cases in which the charge generation layer was outermost) was taken as a measure of the abrasion resistance of the recording material.

The evaluations of electrophotographic properties determined on the recording materials of the following examples relate to the performance of the recording materials in an electrophotographic process with a reusable photoreceptor. The measurements of the performance characteristics were carried out as follows:

The photoconductive recording sheet material was mounted with its conductive backing on an aluminium drum which was earthed and rotated at a circumferential speed of 10 cm/s. The recording material was sequentially charged with a negative corona at a voltage of −4.6 kV operating with a corona current of about 1 μA per cm of corona wire. Subsequently the recording material was exposed (simulating image-wise exposure) with monochromatic light obtained from a monochromator positioned at the circumference of the drum at an angle of 45° with respect to the corona source [see Tables 1 to 8 for the wavelength (λ) in nm of the applied light and the light dose (I.t) used expressed in mJ/m2]. The photo-exposure lasted 200 ms. Thereafter, the exposed recording material passed an electrometer probe positioned at an angle of 180° with respect to the corona source.

After effecting an overall post-exposure with a halogen lamp producing 27,000 mJ/m2 positioned at an angle of 270° with respect to the corona source a new copying cycle was started.

Each measurement relates to 100 copying cycles in which 10 cycles without monochromatic light exposure are alternated with 5 cycles with monochromatic light exposure.

The charging level (CL) is taken as the average charging level over the 90th to 100th cycle, the residual potential (RP) as the residual potential over the 85th to 90th cycle. The % discharge is expressed as:

$$\frac{(CL - RP)}{CL} \times 100,$$

and the fatigue (F) as the difference in residual potential in volts between RP and the average residual potential over the 10th to 15th cycle.

For a given corona voltage, corona current, separating distance of the corona wires to recording surface and drum circumferential speed the charging level CL is only dependent upon the thickness of the charge transport layer and its specific resistivity. In practice CL expressed in volts [V] should be preferably $\geqq 30$ d, where d is the thickness in μm of the charge transport layer (CTL).

Under the applied exposure conditions, simulating practical copying conditions, and by using a charge transport layer in conjuction with a charge generating layer on the basis of X-phthalocyanine as the charge generating pigment, the % discharge (% DC) should be

EXAMPLES 1 and 2 and COMPARATIVE EXAMPLES 1 to 7

In the production of a composite layer electrophotographic recording material a 100 um thick polyester film pre-coated with a vacuum-deposited conductive layer of aluminium was doctor-blade coated with a dispersion of charge generating pigment to a thickness of 0.6 μm with a doctor-blade coater.

Said dispersion was prepared by mixing 1 g of metal-free X-phthalocyanine, 0.1 g of a polyester adhesion-promoting additive DYNAPOL L206 (registered trade mark), 0.9 g of aromatic polycarbonate MAKROLON CD2000 (registered trade mark) [Polymer 8] and 23 g of dichloromethane for 20 minutes in a pearl mill. Said dispersion was diluted with 8 g of dichloromethane to the required coating viscosity.

The applied layer was dried for 15 minutes at 80° C. and then overcoated using a doctor-blade coater with a filtered solution of charge transporting material and binder consisting of 1.5 g of tris(p-tolyl)amine, 2.25 g of the polymer for the appropriate example or comparative example (see Table 1) and 23.03 g of dichloromethane to a thickness also given in Table 1. This layer was then dried at 50° C. for 16 hours.

The characteristics of the thus obtained photoconductive recording materials were determined as described above and the abrasion characteristics and photoconductive behavior are given in Table 1 together with those for 7 comparative examples using polycarbonates or low molecular weight aromatic polyester-carbonates as binders in the charge transporting layer.

TABLE 1

| | | Polymer composition | | | | | | | | $I_{650}{}^{t}$ = 13.2 mJ/m² | | | |
|---|---|---|---|---|---|---|---|---|---|---|---|---|---|
| | Polymer no. | °BPA-aromatic polyester block [wt %] | % terephthalate units in polyester block | °BPA-polycarbonate block [wt %] | weight averaged molecular weight $M_w$ | number averaged molecular weight $M_n$ | $\eta_{rel}$ | Abrasion over 500 rotations [mg] | $d_{CTL}$ [μm] | CL [V] | RP [V] | % discharge | F [V] |
| Example no. | | | | | | | | | | | | | |
| 1 | 1 | 80 | 50 | 20 | 214,734** | 33,168** | 2.22 | 4.4 | 11.4 | −500 | −196 | 60.8 | +28 |
| 2 | 2 | 80 | 50 | 20 | 206,879** | 34,211** | 2.29 | 3.5 | 11.4 | −525 | −207 | 60.6 | +20 |
| Comparative example no. | | | | | | | | | | | | | |
| 1 | 3 | 50 | 50 | 50 | 28,895** | 13,444** | 1.30 | 5.2 | 17.4 | −565 | −186 | 67.1 | +24 |
| 2 | 4 | 60 | 100 | 40 | — | — | — | 5.5 | 16.4 | −596 | −210 | 64.8 | +24 |
| 3 | 5 | 80 | 50 | 20 | 29,458** | 14,629** | 1.305 | 5.6 | 17.4 | −549 | −185 | 66.3 | +18 |
| 4 | 6 | 80 | 50 | 20 | 28,665** | 14,522** | 1.302 | 4.9 | 16.4 | −576 | −214 | 62.8 | +31 |
| 5 | 7 | 80 | 50 | 20 | 28,324** | 14,005** | 1.300 | 5.9 | 16.4 | −558 | −200 | 64.2 | +29 |
| 6 | 8* | — | — | 100 | — | — | | 11.8 | 16.4 | −564 | −192 | 66.0 | +31 |
| 7 | 9+ | — | — | 100 | — | — | | 5.5 | 12.4 | −476 | −169 | 64.5 | +25 |

*Makrolon CD2000 (registered trademark)
+ Makrolon 5700 (registered trademark)
°BPA = bisphenol A
**determined by Gel permeation chromatograph using UV detection and calibration with bisphenol A-polycarbonate samples
$\eta_{rel}$ is the relative viscosity determined for 5 g of polymer per liter of $CH_2Cl_2$ at 25° C., being a measure of the molecular weight of the polymer and increasing with increasing molecular weight.
$d_{CTL}$ represents the thickness of the charge transporting layer.

at least 35% and preferably at least 50%. The fatigue F should preferably not exceed 30 V either negative or positive to maintain a uniform image quality over a large number of copying cycles.

The following examples further illustrate the present invention.

All ratios and percentages mentioned in the Examples are by weight unless otherwise stated.

EXAMPLES 3 and 4 and COMPARATIVE EXAMPLES 8 to 11

The photoconductive recording materials of examples 3 and 4 and comparative examples 8 to 11 were produced as described for examples 1 and 2 with the polymer used in the charge transporting layer and the thickness of this layer being given in Table 2.

The characteristics of the thus obtained photoconductive recording materials were determined as described above and are given in Table 2 together with those for 4 comparative examples using polycarbonates or low molecular weigth aromatic polyester carbonates as binders in the charge transporting layer.

TABLE 2

| | Polymer no. | $d_{CTL}$ [μm] | $I_{780}t = 10.3$ mJ/m² CL [V] | RP [V] | % discharge | F [V] | RP for $I_{780}t$ = 208 mJ/m² [V] | Abrasion over 500 rotations [mg] |
|---|---|---|---|---|---|---|---|---|
| Example no. | | | | | | | | |
| 3 | 1 | 11.4 | −484 | −155 | 68.0 | +26 | −24 | 4.0 |
| 4 | 2 | 11.4 | −836 | −298 | 64.4 | +20 | −76 | 3.5 |
| Comparative example no. | | | | | | | | |
| 8 | 3 | 15.4 | −655 | −242 | 63.0 | +21 | −37 | 5.2 |
| 9 | 5 | 18.4 | −645 | −209 | 67.6 | +30 | −32 | 4.1 |
| 10 | 8 | 17.4 | −809 | −232 | 71.3 | +17 | −29 | 8.0 |
| 11 | 9 | 14.4 | −761 | −239 | 68.6 | +23 | −23 | 6.7 |

EXAMPLE 5 and COMPARATIVE EXAMPLES 12 to 18

The photoconductive recording materials of example 5 and comparative examples 12 to 18 were produced as described for examples 1 and 2 except that the charge transporting layer consisted of 50% by wt of 1,2-bis(1,2-dihydro-2,2,4-trimethylquinolin-1-yl)ethane in polymer instead of 40% by wt of tris(p-tolyl)amine in polymer. The polymers used in the charge transporting layers together with the thicknesses of said layers are given in Table 3.

The characteristics of the thus obtained photoconductive recording materials were determined as described above and are given in Table 3 together with those for 7 comparative examples using polycarbonate or low molecular weight aromatic polyester carbonate as binders in the charge transporting layers.

TABLE 3

| | Polymer no. | $d_{CTL}$ [μm] | $I_{650}t = 13.2$ mJ/m² CL [V] | RP [V] | % discharge | F [V] | Abrasion over 500 rotations [mg] |
|---|---|---|---|---|---|---|---|
| Example no. | | | | | | | |
| 5 | 1 | 10.4 | −524 | −240 | 54.1 | +17 | 5.3 |
| Comparative example no. | | | | | | | |
| 12 | 3 | 15.4 | −687 | −294 | 57.2 | +12 | 6.2 |
| 13 | 4 | 16.4 | −718 | −318 | 55.7 | +8 | 9.8 |
| 14 | 5 | 16.4 | −668 | −288 | 56.9 | +11 | 6.5 |
| 15 | 6 | 16.4 | −725 | −338 | 53.4 | +4 | 5.6 |
| 16 | 7 | 15.4 | −710 | −344 | 51.5 | −5 | 5.5 |
| 17 | 8 | 14.4 | −770 | −300 | 61.0 | +15 | 12.3 |
| 18 | 9 | 15.4 | −506 | −214 | 57.7 | +8 | 5.4 |

EXAMPLE 6 and COMPARATIVE EXAMPLES 19 to 24

The photoconductive recording materials of example 6 and comparative examples 19 to 24 were produced as described for examples 1 and 2 except that the polymer 8 in the charge generating layer was replaced by the polymer given in Table 4 and the polymer and charge transporting material in the charge transporting layer were polymer 8 and 1,2-bis(1,2-dihydro-2,2,4-trimethylquinolin-1-yl)ethane respectively instead of a particular polymer and tris(p-tolyl)amine.

The characteristics of the thus obtained photoconductive recording materials were determined as described above and are given together with the thicknesses of the charge transporting layers in Table 4 together with those for 6 comparative examples using polycarbonate or low molecular weight aromatic polyester carbonates as binders in the charge generating layer.

TABLE 4

| | Polymer no. | $d_{CTL}$ [μm] | $I_{650}t = 13.2$ mJ/m² CL [V] | RP [V] | % discharge | F [V] |
|---|---|---|---|---|---|---|
| Example no. | | | | | | |
| 6 | 1 | 14.4 | −696 | −317 | 54.4 | +22 |
| Comparative example no. | | | | | | |
| 19 | 3 | 17.4 | −771 | −325 | 57.8 | +15 |
| 20 | 4 | 17.4 | −770 | −318 | 58.7 | +19 |
| 21 | 5 | 16.4 | −752 | −308 | 59.1 | +9 |
| 22 | 6 | 16.4 | −758 | −307 | 59.5 | +14 |
| 23 | 7 | 15.4 | −702 | −280 | 60.1 | +21 |
| 24 | 8 | 14.4 | −770 | −300 | 61.0 | +15 |

EXAMPLE 7 and COMPARATIVE EXAMPLE 25

Example 7 and comparative example 25 were produced as described for examples 1 and 2 except that the Dynapol L206 (registered trade mark) and MAKROLON CD2000 (registered trade mark) were replaced by the polymer used in the charge generating layer as specified in Table 5 and the charge generating layer consisted of 50% by weight of 1,2-bis(1,2-dihydro-2,2,4-trimethylquinolin-1-yl)ethane in polymer instead of 40% by weight of tris(p-tolyl)amine in polymer.

The characteristics of the thus obtained photoconductive recording materials were determined as described above except for the adhesion of the charge generating layer to the aluminized polyester substrate. This was determined by bending the photoconductor foil in the direction of the substrate and observing the adhesion of the charge generating layer to the aluminized polyester substrate. In the case of comparative example 25 with polymer 4 the charge generating layer immediately detached itself from the aluminized polyester substrate. This was not observed in the case of example 7 with polymer 1 a polyester carbonate with the same composition as polymer 4, but with a weight averaged molecular weight above 100,000. These characteristics together with the thicknesses of the charge transporting layers are summarized in Table 5.

TABLE 5

| | Polymer no. | $d_{CTL}$ [μm] | Generating layer adhesion to aluminized polyester substrate | $I_{650}{}^{t}$ = 13.2 mJ/m² CL [V] | RP [V] | % discharge | F [V] |
|---|---|---|---|---|---|---|---|
| Example no. | | | | | | | |
| 7 | 1 | 12.4 | good | −609 | −297 | 51.2 | +14 |
| Comparative Example no. | | | | | | | |
| 25 | 4 | 15.4 | poor | −898 | −446 | 50.3 | +8 |

EXAMPLE 8 and COMPARATIVE EXAMPLES 26 to 28

The photoconductive recording materials of Example 8 and Comparative Examples 26 to 28 were produced by first doctor-blade coating a 100 μm thick polyester film precoated with a vacuum-deposited conductive layer of aluminium with a 1% solution of γ-aminopropyltriethoxy silane in aqueous methanol. After solvent evaporation and curing at 100° C. for 30 minutes, the thus obtained adhesion/blocking layer was doctor-blade coated with a filtered solution of charge transporting material and binder consisting of 3 g of 1,2-bis-(1,2-dihydro-2,2,4-trimethyl-quinolin-1-yl) ethane, 3 g of polymer 9 and 44 g of dichloromethane to a thickness of about 13 μm.

After drying for 15 minutes at 50° C., this layer was coated with a dispersion of charge generating pigment to the thicknesses given in Table 6. Said dispersion was prepared by mixing 1.33 g of metal-free X-phthalocyanine, 2.66 g of 1,2-bis(1,2-dihydro-2,2,4-trimethyl-quinolin-1-yl) ethane, 2.66 g of the polymer for the appropriate example or comparative example in Table 6 and 40.9 g of dichloromethane for 15 minutes in a pearl mill. Subsequently the dispersion was diluted with 7.9 g of dichloromethane to the required coating viscosity. The layer was then dried at 50° C. for 16 hours.

The characteristics of the thus obtained photoconductive recording materials were determined as described above and the abrasion characteristics (abrasion after 200 TABER abrader rotations due to the thinner outermost layer) and behaviour are given in Table 6.

TABLE 6

| | Polymer no. | $d_{CTL}$ [μm] | Abrasion over 200 rotations [mg] | $I_{650}{}^{t}$ = 13.2 mJ/m² CL [V] | RP [V] | % discharge | F [V] | RP for $I_{650}{}^{t}$ = 264 mJ/m² [V] |
|---|---|---|---|---|---|---|---|---|
| Example no. | | | | | | | | |
| 8 | 1 | 5 | 4.4 | +856 | +205 | 76.1 | −29 | +48 |
| Comparative Example no. | | | | | | | | |
| 26 | 5 | 8 | 7.4 | +822 | +193 | 76.5 | +13 | +59 |
| 27 | 8 | 7 | 9.3 | +834 | +214 | 74.3 | −38 | +52 |
| 28 | 9 | 8 | 5.3 | +804 | +200 | 75.1 | +3 | +41 |

EXAMPLES 9 and 10 and COMPARATIVE EXAMPLES 29 and 30

The photoconductive recording materials of Example 9 and Comparative Example 29 were produced by first doctor-blade coating a 100 μm thick polyester film precoated with a vacuum-deposited conductive layer of aluminium with a 1% solution of γ-aminopropyltriethoxy silane in aqueous methanol. After solvent evaporation and curing at 100° C. for 30 minutes, the thus obtained adhesion/blocking layer was doctor-blade coated with a dispersion of a charge generating pigment to a thickness of 0.6 μm. Said dispersion was prepared by mixing 1 g of 4,10-dibromo-anthanthrone, 1 g of the binder given in Table 7 and 18 g of dichloromethane for 20 minutes in a pearl mill. Subsequently the dispersion was diluted with 5 g of dichloromethane to the required coating viscosity. The layer was then dried at 80° C. for 15 minutes after which it was overcoated using a doctor-blade coater with a filtered solution of charge transporting material and binder consisting of 3 g of 1,2-bis(1,2-dihydro-2,2,4-trimethyl-quinolin-1-yl)ethane, 4.5 g of Polymer 9 of Table 1 hereinbefore and 67.5 g of dichloromethane to the thicknesses given in Table 7. This layer was then dried at 50° C. for 16 hours.

The photoconductive recording materials of Example 10 and Comparative Example 30 were produced as described respectively for Example 9 and Comparative Example 29 except that the dispersions of charge generating pigment for Example 9 and Comparative Example 29 had been allowed to stand for 24 hours before the corresponding charge generating layers were cast.

The electro-optical characteristics of the thus obtained photoconductive recording materials were determined as described above and are given in Table 7.

The polymer used in the charge generating layer is defined by number in column 2 of Table 7, the composition of the No. 4 polymer being given in Table 1.

The standing time expressed in hours [h] of the charge generating layer dispersion is given in column 3.

TABLE 7

| | Polymer no. | Standing time [h] | Charge transport layer thickness [μm] | $I_{540}{}^{t}$ = 12 mJ/m² CL [V] | RP [V] | % discharge |
|---|---|---|---|---|---|---|
| Example no. | | | | | | |
| 9 | 10* | 0 | 11.4 | −736 | −188 | 74.5 |

TABLE 7-continued

| | Polymer no. | Standing time [h] | Charge transport layer thickness [μm] | $I_{540}t = 12$ mJ/m² CL [V] | RP [V] | % discharge |
|---|---|---|---|---|---|---|
| 10 | 10* | 24 | 12.4 | −779 | −164 | 78.9 |
| Comparative Examples no. | | | | | | |
| 29 | 4 | 0 | 10.4 | −737 | −152 | 79.4 |
| 30 | 4 | 24 | 12.4 | −799 | −212 | 73.5 |

The polymer 10 indicated by * contains 90% by weight BPA-aromatic polyester blocks, 10% by weight BPA-polycarbonate blocks with 50% terephthalate units in the polyester blocks and has a relative viscosity value of 1.290 determined as described at the bottom of Table 1.

The above results at different "standing times" demonstrate the enhanced dispersion stability of the 4,10-dibromoanthanthrone particles in said polymer no. 10 compared with the dispersion in BPA-polycarbonate [polymer no. 4] thereby resulting in improved electro-optical characteristics when using said polymer no. 10.

EXAMPLE 11 and COMPARATIVE EXAMPLE 31

The photoconductive recording materials of Example 11 and Comparative Example 31 were produced as described for Example 9 and Comparative Example 29 except that the adhesion/blocking layer was dispensed with and in the photoconductive recording material of Comparative Example 31 10% by weight of the binder in the charge generating layer of the photoconductive recording material of Comparative Example 29 [Polymer no. 4] has been replaced by a polyester adhesion-promoting additive DYNAPOL L206 (registered trade mark), since the charge generating layers with Polymer no. 4 as the sole binder exhibit poor adhesion. .

The resulting photoconductive recording materials both exhibited excellent adhesion to the 100 μm thick polyester film precoated with a vacuum-deposited conductive layer of aluminium.

The electro-optical characteristics for the photoconductive recording materials of Example 11 and Comparative Example 31 are given in Table 8 below and show improved electro-optical behaviour of the photoconductive recording material of Example 11 with polymer no. 10 as the sole charge generating layer binder compared with that of comparative Example 31 with a binder consisting of a 90/10 mixture of the BPA-polycarbonate polymer no. 4 and the adhesion-promoting polyester DYNAPOL L206 (registered trade name) polymer no. 11.

TABLE 8

| | Polymer used in charge generating layer | Charge transport layer thickness [μm] | $I_{540}t = 12$ mJ/m² CL [V] | RP [V] | % discharge |
|---|---|---|---|---|---|
| Example no. | | | | | |
| 11 | 10 | 9.4 | −759 | −193 | 74.6 |
| Comparative Example no. | | | | | |
| 31 | 4/11++ | 12.4 | −782 | −270 | 65.5 |

TABLE 8-continued

| Polymer used in charge generating layer | Charge transport layer thickness [μm] | $I_{540}t = 12$ mJ/m² CL [V] | RP [V] | % discharge |
|---|---|---|---|---|
| 90/10 | | | | |

++ Dynapol L206 (registered trade name).

We claim:

1. A photoconductive recording material having a conducting electrode coated with at least one binder layer incorporating at least one polyester carbonate copolymer containing aromatic polyester and aromatic carbonate units and wherein the aromatic carbonate units are present in the range of 10 to 48 mole % of said copolymer and correspond to the following general formula (I):

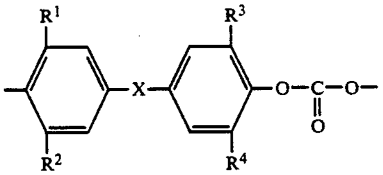
(I)

in which: X represents S, $SO_2$, 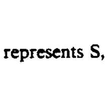 or 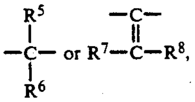, each of $R^1$, $R^2$, $R^3$, $R^4$, $R^7$ and $R^8$ (same or different) represents hydrogen, halogen, an alkyl group or an aryl group, and each of $R^5$ and $R^6$ (same or different) represents hydrogen, an alkyl group, an aryl group or together represent the necessary atoms to close a cycloaliphatic ring, and wherein the aromatic ester units are present in the range of 52 to 90 mole % of said copolymer and have at least one of the compositions represented by the general formulae (II and III):

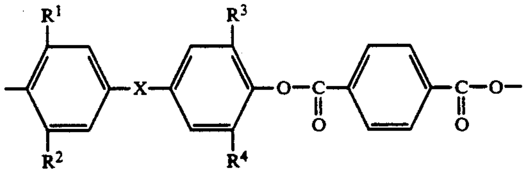
(II)

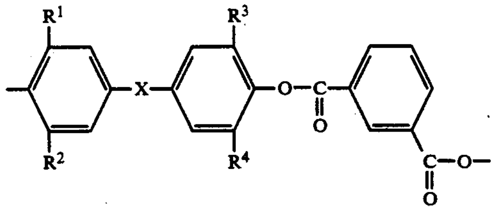
(III)

in which: X, $R^1$, $R^2$, $R^3$ and $R^4$ have the same meaning as described above, said polyester carbonate having a weight averaged molecular weight in the range of 120,000 to 1,000,000.

2. A photoconductive recording material according to claim 1, wherein said binder layer is an active layer playing a role in the formation of an electrostatic charge image and is selected from the group consisting of a charge transport layer; a charge generating layer, and a layer containing both charge generating and charge transporting substances.

3. A photoconductive recording material according to claim 2, wherein the charge transport layer contains as the sole binder one or more of said polyester carbonate copolymers and at least 30 wt % of charge transport substance(s).

4. A photoconductive recording material according to claim 2, wherein the charge generating layer contains as the sole binder one or more of said polyester carbonate copolymers and at least 30 wt % of charge generating substance(s).

5. A photoconductive recording material according to claim 1, wherein said polyester carbonate copolymer(s) is (are) applied in admixture with a polyacetal, polyurethane, polyester-urethane or aromatic polycarbonate, said combination containing at least 50% by weight of said polyester carbonate copolymer(s) in the total binder content.

6. A photoconductive recording material according to claim 1, wherein said polyester carbonate copolymer(s) is (are) applied in admixture with electronically inactive binder resins selected from the group consisting of cellulose esters, acrylate and methacrylate resins, polyvinyl chloride, copolyvinyl chloride/acetate and copolyvinyl chloride/maleic anhydride, polyester resins, silicone resins, polystyrene and copolymers of styrene and maleic anhydride and copolymers of butadiene and styrene.

7. A photoconductive recording material according to claim 1, wherein the recording material contains an outermost "non-active" layer serving as protective layer which layer consists of at least one of said polyester carbonate copolymers or contains at least one of said copolymers in combination with at least one other polymer improving abrasion resistance.

8. A photoconductive recording material according to claim 1, wherein said polyester carbonate copolymer(s) is (are) applied in admixture with a copolyester of terephthalic acid and isophthalic acid with ethylene glycol and neopentyl glycol, the molar ratio of tere- to isophthalic acid being 3/2.

9. A photoconductive recording material according to claim 1, wherein said polyester carbonate copolymer(s) are applied in admixture with an aromatic polycarbonate having one or more repeating units within the scope of following general formula:

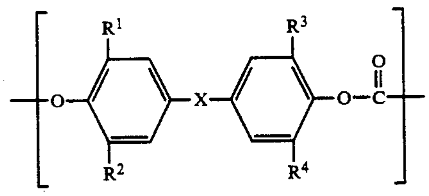

wherein: X, $R^1$, $R^2$, $R^3$ and $R^4$ have the same meaning as described in general formula (I) of claim 1, said aromatic polycarbonates having a molecular weight in the range of 10,000 to 200,000.

10. A photoconductive recording material according to claim 2, wherein the charge transport layer has a thickness in the range of 5 to 50 μm.

11. A photoconductive recording material according to claim 2, wherein the single active layer has a thickness in the range of 5 to 50 μm and contains charge generating pigments or dyes in concentrations between 0.1 and 40% by weight.

12. A photoconductive recording material according to claim 1, wherein the conducting electrode element is an aluminium support or supported aluminium layer.

* * * * *